United States Patent

[11] 3,558,946

[72] Inventor: Stanley A. Cory, Canoga Park, Calif.
[21] Appl. No.: 702,118
[22] Filed: Jan. 31, 1968
[45] Patented: Jan. 26, 1971
[73] Assignee: TRW Inc., Redondo Beach, Calif., a corporation of Ohio

[54] FORCE TRANSDUCER HAVING HYDRODYNAMIC BEARING SUPPORTED RESPONSIVE ELEMENT
10 Claims, 4 Drawing Figs.

[52] U.S. Cl. ................................ 310/112, 73/516, 310/114, 324/71
[51] Int. Cl. .................................. G01p 15/08
[50] Field of Search ........................ 73/516, 517, 517R, 503, (Inquired); 324/71, (Inquired); 310/90, 112, 114, 124.5, (Inquired) 156; 318/115, 214, 243; 336/110, (Inquired)

[56] References Cited
UNITED STATES PATENTS

| | | | | |
|---|---|---|---|---|
| 2,796,571 | 6/1957 | Dunn | | 310/112X |
| 3,068,704 | 12/1962 | Parker | | 73/516 |
| 3,124,962 | 3/1964 | Hirtreiter | | 73/516 |
| 3,134,037 | 5/1964 | Upton | | 310/90 |
| 3,175,404 | 3/1965 | Entin | | 73/516 |
| 3,196,301 | 7/1965 | Turk | | 310/90 |
| 2,632,123 | 3/1953 | Kober | | 310/156 |

Primary Examiner—Oris L. Rader
Assistant Examiner—H. Huberfeld
Attorneys—Daniel T. Anderson, Donald R. Nyhagen and Jerry A. Dinardo ABSTRACT: A force transducer having a barrel containing a rotor member which is positioned axially relative to the barrel by the conjoint action of the force being monitored and a resisting or biasing force on the member. The rotor member is driven in rotation to create between the member and barrel a hydrodynamic bearing which supports the member for relatively frictionless axial movement under the influence of the monitored force. The axial position of the rotor member relative to the barrel is sensed to provide a readout related to the monitored force.

PATENTED JAN 26 1971 3,558,946
SHEET 2 OF 2
Fig. 2
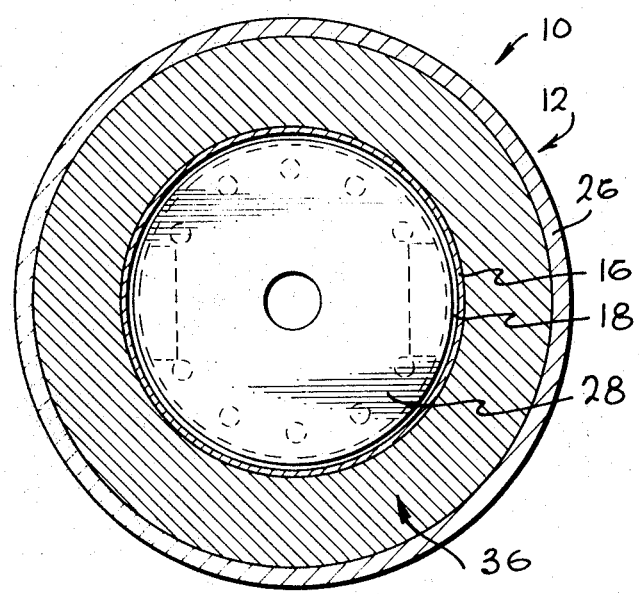
Fig. 4
| Sensor Rotor Shape | Sensor Voltage VS Rotor Displacement |
|---|---|
| (a) 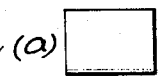 | 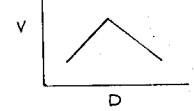 |
| (b) 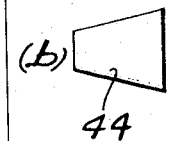 | 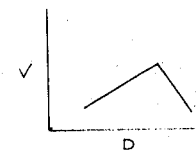 |
| (c) 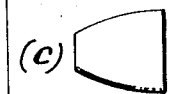 | 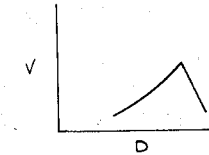 |
| (d)  | 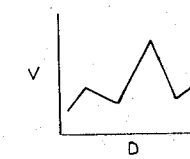 |
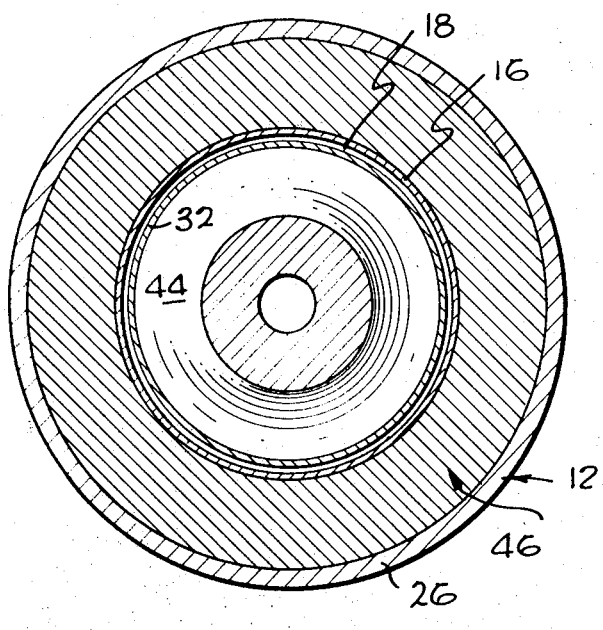
Fig. 3
STANLEY A. CORY
INVENTOR.
BY Donald R. Nyhagen
ATTORNEY

FORCE TRANSDUCER HAVING HYDRODYNAMIC BEARING SUPPORTED RESPONSIVE ELEMENT

BACKGROUND OF THE INVENTION

1. Field of the Invention

This invention relates generally to force transducers of the class having a member which is positioned axially in response to the force being monitored and whose axial position is sensed to provide a readout related to the monitored force. The invention relates more particularly to such a force transducer wherein the force response member is driven in rotation within a containing barrel to create between the responsive member and barrel a hydrodynamic bearing which supports the member for relatively frictionless axial movement under the influence of the monitored force.

2. Prior Art

Force transducers of the general class to which the present invention pertains are well known in the art. Such transducers may be employed to monitor a variety of functions. In some applications, the monitored function is the actual force to which the transducer is made responsive, as in the case of a transducer used as an accelerometer for sensing or measuring acceleration and deceleration forces. In other applications, the function being monitored is converted in some manner to a force related to the function and the transducer is rendered responsive to this force. Examples of these latter applications are those in which a transducer is utilized to sense or measure electrical currents, fluid pressures, and the like.

The usefulness of transducers of the type under discussion depends in large part on their sensitivity, that is the change in the monitored force which is required to produce a corresponding displacement of the force responsive member. Sensitivity, in turn, depends on the resistance opposing movement of the responsive member under the influence of the monitored force. Accordingly, improving sensitivity requires reducing the frictional resistance between the responsive member and its containing housing. In this regard, the existing transducers of which I am aware, are deficient for the reason that the force responsive member simply slides in the housing. As a consequence, displacement of the responsive member under the influence of the monitored force is opposed by the mechanical friction between these parts. While the magnitude of this friction may be reduced to a relatively low value in various ways, there always remains on undesirable frictional drag on the responsive member. This frictional drag not only reduces the sensitivity of the transducer but also introduces error into the transducer output owing to changes in the factors which influence the friction between the responsive member and its housing.

SUMMARY OF THE INVENTION

The present invention provides an improved force transducer of the character described which cures the above noted and other defects of the existing instruments. According to the present invention, this is accomplished by utilizing in the transducer a cylindrical force responsive member, or rotor member as it is referred to herein, which is contained within a cylindrical barrel and is radially sized relative to the barrel in such a way as to define between the barrel and member an intervening annular hydrodynamic bearing gap. The rotor member is driven in rotation relative to the barrel at a speed which creates within the gap a hydrodynamic bearing. This hydrodynamic bearing supports the rotor member for virtually frictionless axial movement relative to the barrel under the influence of the force being monitored. Biasing means may be provided in the transducer for producing on the rotor member a yieldable resisting or biasing force in opposition to the force being monitored, such that the rotor member tends to assume a balanced or null position related to the monitored force. The transducer is also equipped with sensing means for sensing the axial position of the rotor member relative to the barrel so as to provide a readout related to the monitored force.

It will become evident as the description proceeds that the present transducer may utilize various driving means for driving the rotor member to generate its hydrodynamic bearing, various biasing means for producing a biasing force on the rotor member, and various sensing means for sensing the axial position of the rotor member and providing a readout related to the force being monitored. In the particular embodiment of the invention which has been selected for presentation in this disclosure, the rotor member is driven by electrical motor means including rotor means integral with the rotor member and stator means on the barrel. According to the feature of this disclosed embodiment, the motor means serve the additional function of biasing means for producing on the rotor member the biasing force against which the monitored force is balanced to effect axial positioning of the rotor member in response to the monitored force and thereby provide a readout related to the latter force. To this end, the motor means comprise a pair of axially spaced rotors on the rotor member and a pair of axially spaced stators on the barrel. The axial spacing between the stators differs from the axial spacing between the rotors in such a way that the stators may be selectively energized to produce a selectively variable biasing force on the rotor member. The rotor member position sensing means embodied in the disclosed transducer of the invention comprises a permanent magnetic sensor rotor on the rotor member and a sensor winding on the barrel. This winding is inductively coupled to the sensor rotor in such a way that rotation of the rotor with the rotor member induces or generates within the winding a voltage which is a combined function of the angular velocity of the rotor member and the axial position of the rotor member relative to the barrel. According to a further feature of this disclosed embodiment, the two driving motors for the rotor member are synchronous induction motors which are effective to drive the rotor member at synchronous speed regardless of the voltage impressed on the motor stators. As a consequence, the stator voltage may be adjusted to regulate the axial bias force on the rotor member without altering the rotary speed of the member and hence the output voltage generated within the sensor winding. This particular feature of the transducer is beneficial for the reason that the effective "stiffness" of response of the transducer, that is the change in the monitored force required to produce a given axial displacement of the rotor member, may be regulated to adjust the operating range of the transducer without affecting its sensor output voltage. In other words, this output voltage is a sole function of the monitored force.

As noted earlier, and hereinafter explained, the present transducer may be employed for a variety of force monitoring applications. Among these applications are accelerometer, artificial horizon, angular velocity generator, ship stabilizer, velocity switch, pressure switch, signal generator, and so on.

BRIEF DESCRIPTION OF THE DRAWINGS

In the drawings:
FIG. 2 is a section taken on line 2–2 in FIG. 1;
FIG. 3 is a section taken on line 3 3 in FIG. 1
and
FIG. 4 illustrates various sensor rotor configurations which may be used in certain applications of the transducer.

DESCRIPTION OF THE PREFERRED EMBODIMENTS

Figure 1:
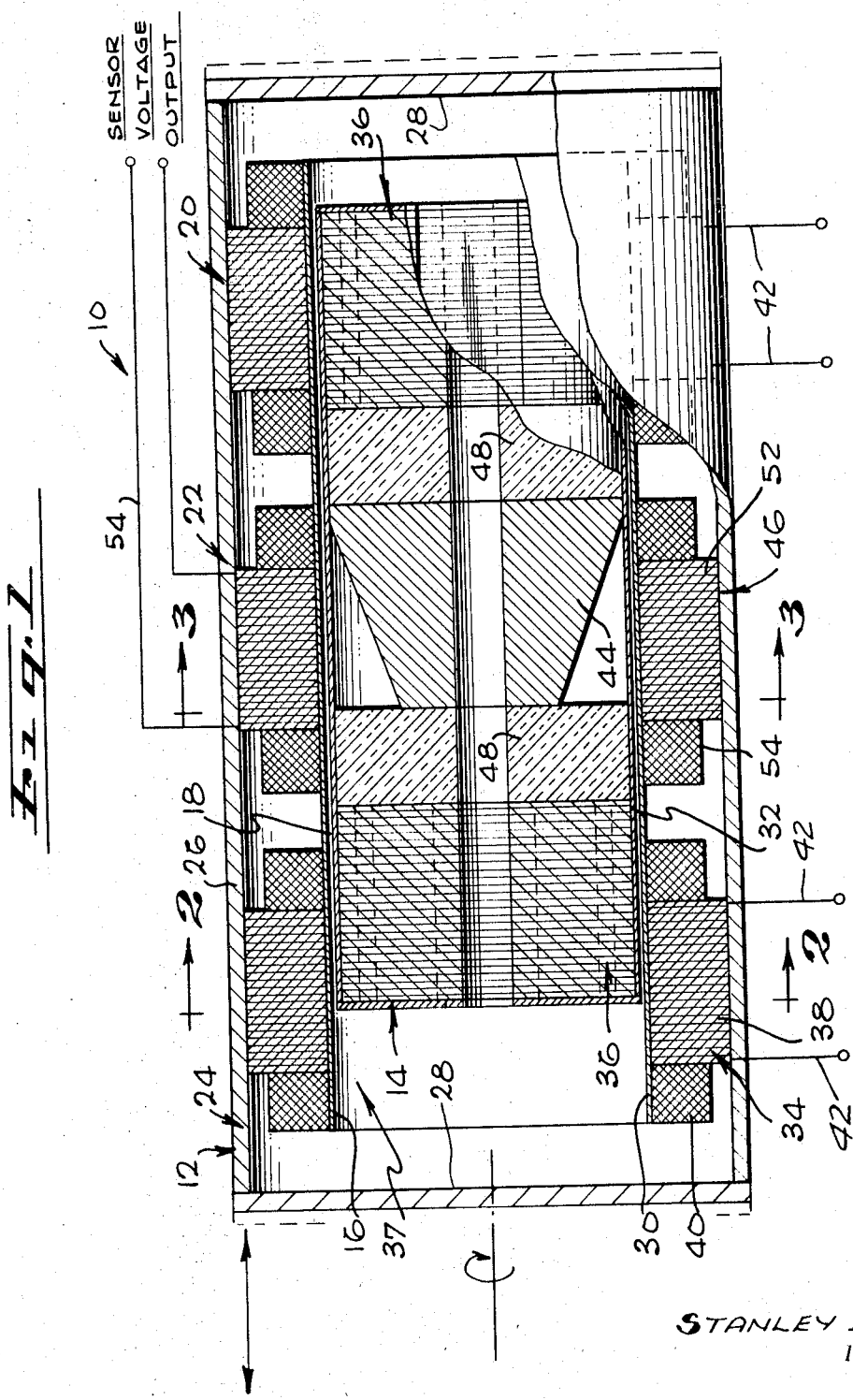
FIG. 1 is a longitudinal section through a transducer according to the invention.

Referring now to these drawings, it will be observed that the invention provides a force transducer, represented in the drawings by the transducer 10, characterized in general terms by a housing in the form of a barrel 12 containing a rotor member 14. The rotor member 14 is both rotatable and axially movable relative to the barrel and is so radially sized with respect to the bore 16 in the barrel as to define an annular, radially narrow hydrodynamic bearing gap 18 between the rotor member and the barrel. Means 20 are provided for driving the rotor member in rotation at a speed which generates within the gap a hydrodynamic bearing. This bearing supports the rotor member for virtually frictionless axial movement relative to the barrel in response to the force being monitored. The instrument may also be equipped with biasing means for producing on the rotor member a yieldable axial biasing force in opposition to the monitored force, whereby the rotor member assumes a balanced or null position related to the monitored force. Sensing means 22 are provided for sensing the axial position of the rotor member 14 relative to the barrel 12 to provide a readout related to the monitored force. In the particular embodiment of the invention illustrated, the biasing force on the rotor member is furnished by the driving means 20, which thus serve the dual function of a driving means and a biasing means. The illustrated sensing means 22 generates an electrical output signal related to the axial position of the rotor member 14. This signal, therefor, provides a readout related to the monitored force.

Briefly, in operation of the transducer 10, the combined driving-biasing means 20 are activated to drive the rotor member 14 in rotation and thereby generate its hydrodynamic bearing and to produce on the rotor member and axial biasing force. The rotor member is made responsive to the function or force being monitored in such a way that the member is axially positioned by the conjoint action of the biasing force and the monitored force. The sensing means 22 then generates an electrical output signal related to the monitored force. By way of example, the transducer may be employed as an accelerometer by arranging the instrument in such a way that its rotor member 14 responds to the acceleration or deceleration force to be monitored. The instrument then provides an output or readout related to the acceleration or deceleration force.

Referring now in greater detail to the embodiment of the invention which has been selected for illustration, it will be observed that the transducer barrel 12 has an outer cylindrical housing 24 including an outer sleeve 26 closed at its ends by end plates 28. Extending concentrically through the housing is an inner sleeve 30. The central opening in this inner sleeve defines the bore 16. Rotor member 14 is contained within the bore 16 and has an overall length somewhat less than the barrel 12. The rotor member has an outer sleeve 32 which extends the full length of the member. The barrel sleeve 30 is internally finished and the rotor sleeve 32 is externally finished to provide these sleeves with confronting high-grade air bearing surfaces which are radially sized to define between the surfaces the annular hydrodynamic bearing gap 18. This bearing gap, in a typical transducer according to the invention, may have a radial width on the order of .0003 to .0005 inches. It is evident at this point that the rotor member 14 is free to rotate and move axially relative to the barrel 12.

The illustrated rotor driving-biasing means 20 comprises electrical motor means including a pair of motor stators 34 and a pair of motor rotors 36. Stators 34 are mounted within opposite ends of the barrel housing 24, in the annular space between the outer and inner barrel sleeves 26, 30. The rotors 36 are contained within the ends of the rotor sleeve 32. Stators 34 and their respective rotors 36 constitute electrical motors 37. These motors are adapted to be energized to drive the rotor member 14 in rotation at a speed to generate within the annular gap 18 a hydrodynamic air bearing which supports the rotor member for relatively frictionless rotation and axial movement relative to the barrel 12. It will become evident as the description proceeds that a variety of electrical motor types may be employed in the transducer. For reasons to be explained presently, however, the motors preferably comprise synchronous induction motors, and for this reason, such motors have been illustrated. Thus, the motor stators 34 comprise generally conventional induction motor stators having annular iron cores 38 and windings 40. The motor rotors 36 comprise generally conventional synchronous induction rotor cores. The leads 42 of the stator windings 40 extend to the outside of the transducer barrel 12 for connection to a suitable AC electrical power supply. It is now evident, therefore, that when the motor windings 40 are energized, the motor rotors 36, and hence the entire rotor member 14, are driven at synchronous speed.

As noted earlier, the driving means 20 serve the secondary function of biasing means for producing an axial biasing force on the rotor member 14. In this regard, it will be observed that the axial spacing between the induction motor stators 34 differs from the axial spacing between the induction motor rotors 36. In this case, the stator spacing is greater than the rotor spacing. As a consequence, when either motor rotor is axially centered relative to its stator, the other motor rotor and stator are axially offset. It is evident, therefore, that if the stator windings 40 are equally energized, a magnetic centering force will be exerted on the rotor member 14 which will urge this member to an axially centered position relative to the motor stators 34. The magnitude of this centering force is obviously related to the current flow through the stator windings and may be adjusted by regulating such current flow. Alternatively, the stator windings may be differentially energized to produce a decentering force on the rotor member 14 for urging the latter in either axial direction from its centered position to a new position of balanced minimum reluctance. In this disclosure, the stationary position which the rotor member 14 tends to assume under any energizing current flow through the motor windings 40 is referred to as the neutral position of the member.

It is significant to note here that since the drive motors 37 are synchronous induction motors, the rotor member 14 will continue to rotate at synchronous speed regardless of the magnitude of the voltages impressed on the stators windings 40. As a consequence, these impressed voltages may be regulated to adjust the axial biasing force on the rotor member, without altering its rotary speed. As will appear presently, this feature of the invention is important to the operation of the illustrated rotor position sensing means 22.

It will be recalled that the function of the position sensing means 22 is to sense the axial position of the rotor member 14 relative to the transducer barrel 12 and to provide a readout related to this position. As noted earlier, a variety of sensing means may be employed for this purpose, depending upon the particular application of the transducer and readout accuracy desired. For example, the sensing means may conceivably comprise merely reference or scale markings on the barrel and rotor member for effecting a simple visual readout of the rotor position. Alternatively, some type of microsyn, synchro, resolver device or other magnetic or capacitive sensing device may be employed. A photo-optical position sensing means may also be employed, such as one wherein a light beam is reflected from an end face on the rotor member to a photosensitive receiver in a manner such that axial displacement of the rotor member modulates the incident light on the receiver and hence the receiver output.

The particular rotor sensing means 22 illustrated comprises a magnetic sensing device including a magnetically permeable sensor element or rotor 44 operatively connected to the rotor member 14 for axial movement with the member and a sensor stator 46 on the barrel 12. This sensor stator is inductively coupled to the sensor rotor 44 in such a way that axial movement of the rotor member 14 varies the inductive coupling between the sensor rotor and stator. In this case, the sensor rotor 44 is a permanent magnetic rotor which is positioned within the rotor sleeve 32, midway between the induction motor rotors 36, and is magnetically isolated from the latter rotors by a nonmagnetically permeable spacers 48. The sensor rotor 44 is diametrically magnetized. The sensor stator 46 is a single or polyphase wound stator having an annular core 52 and a winding 54 on the core. Core 52 is positioned within the barrel 12 between its outer and inner sleeves 26, 30 and is located midway between the induction motor stators 34. The sensor winding leads 54 extend to the outside of the barrel.

The present transducer is arranged in such a way that when the rotor member 14 occupies its axially centered position in the barrel 12, the sensor rotor 44 is axially centered relative to its sensor stator 46. Accordingly, when the rotor member 14 is driven in rotation, the sensor rotor 44 generates or induces within the sensor winding 52 a voltage which diminishes progressively in s response to axial movement of the rotor member 14 in either direction from its centered position. The sensing means 22 thus provides an electrical output signal related to the axial position of the rotor member with respect to the barrel 12.

The several parts of the barrel 12 and the several parts of the rotor member 14 may be mutually joined in any convenient way. For example, these parts may be press fitted in and/or joined by epoxy cement to the barrel sleeves 26, 30 and the rotor sleeve 32, respectively.

The operation of the illustrated transducer 10 is believed to be obvious from the preceeding description. Briefly reviewing this operation, the induction motor windings 40 are energized to drive the rotor member 14 in rotation at a synchronous speed which generates within the annular bearing gap 18 a hydrodynamic air bearing. This air bearing supports the rotor member 14 in the barrel 12 for relatively frictionless rotation and axial movement. The magnetic coupling between the induction motor stators 34 and rotors 36 produces opposing axial biasing forces on the rotor member. If the stator windings are equally energized, these biasing forces urge the rotor member 14 to a centered neutral position in the barrel 12. Differential energizing of the stator windings 40 produces a decentering force on the rotor member which urges the latter to a decentered neutral position of minimum reluctance determined by the relative magnitudes of the current flows in the windings.

Rotation of the rotor member 14 in the barrel 12 causes the sensor rotor 44 to generate or induce within the sensor winding 52 a voltage related to the axial position of the rotor member with respect to the barrel. This sensor voltage has a given value when the rotor member is axially centered in the barrel and changes in response to shifting of the rotor member in either direction from its centered position. If the sensor rotor has a uniform radial dimension from end-to-end, as in FIG. 4 *a*, the voltage induced in the sensor winding will be maximum when the rotor member occupies its centered position and will diminish progressively in response to axial displacement of the rotor member in either direction from its centered position, as indicated by the graph. If desired, the sensor rotor 44 may be axially tapered, as shown in FIGS. 1 and 4 *b*, to increase the gradient of the voltage induced in the sensor winding 40 and to cause the sensor voltage to vary in response to axial displacement of the rotor member 14 in the manner shown in the graph of FIG. 4 *b* to enable the direction of the displacement to be determined by proper calibration of the instrument. FIGS. 4 *c* and 4 *d* illustrate other possible sensor core shapes and the corresponding sensor voltage—rotor displacement relationships.

It will be immediately evident to those versed in the art that the present transducer is susceptible in a wide variety of uses and applications. Among these applications are those mentioned earlier, to wit accelerometer, artificial horizon, angular velocity generator, ship stabilizer, velocity switch, pressure switch, signal generator, and so on. The transducer also lends itself very readily to complete closed loop servo control. It is unnecessary to explain in detail all of these various applications. Suffice it to say that in each application, the rotor member 14 is made responsive to the function of force to be monitored in such a way that the member is positioned axially in response to the monitor force. Consider, for example, the accelerometer application, just mentioned. In this application, the transducer is oriented with its longitudinal axis parallel to or generally parallel to the direction of motion such that an acceleration or deceleration force occasioned by a change in the speed of the motion reacts on the rotor member 14 in its axial direction. This force urges the rotor member axially from its neutral position established by the opposing biasing forces on the member and to a new position wherein the several forces on the rotor member are in balance. The output voltage on the sensor winding 52 then provides a readout related to the acceleration or deceleration force.

A unique feature of the transducer resides in the fact that the inherent "stiffness" of the transducer response, that is the change in the monitored force required to cause a given axial displacement of the rotor member 14, and hence the sensitivity of the transducer may be adjusted by regulating the voltages impressed on the induction motor stators 34. Thus, increasing these voltages will increase the biasing forces on the rotor member and thereby reduce the sensitivity of the transducer. Similarly, reducing the stator voltages increases the sensitivity. In this way, the sensitivity of the instrument may be regulated to a level compatible with the magnitude of the forces to be monitored.

According to another application of the transducer, the latter may be utilized to monitor an electrical signal by impressing the latter on one of the induction motor stators 34 and impressing a reference signal on the other stator in such a way that a change in the monitored signal will cause a corresponding axial displacement of the rotor member 14. The output voltage from the sensor winding 44 then provides a readout related to the monitored signal. Alternatively, the transducer may be employed as a signal generator for generating in the sensor winding 44 a voltage signal which may be controlled by regulating the voltages impressed on the induction motor stators 34.

A unique feature of the illustrated transducer which is beneficial in some, if not all of its applications, and notably the accelerometer application discussed above, resides in the fact that the rotor member 14 continues to turn at synchronous speed regardless of the voltages impressed on the induction motor stators 34. As a consequence, in the accelerator application, the biasing forces on the rotor member and hence the sensitivity of the instrument may be regulated without affecting the sensor output voltage. In other words, this output voltage will be a sole function of the force being monitored.

While the invention has been disclosed in what is presently conceived to be its preferred and most practical embodiments, it should be understood that various modification of the invention are possible within the spirit and scope of the following claims.

I claim:

1. An electrical transducer comprising:

a barrel;

an elongate rotor member within said barrel having a central longitudinal spin axis;

bearing means supporting said rotor member within said barrel for rotation of said member on and endwise movement of said member along said spin axis;

a pair of electrical motor means spaced along said spin axis for rotating said rotor member on said axis while permitting endwise movement of said member along said axis;

each said motor means including a motor rotor on said rotor member and a motor stator in said barrel about said motor rotor and adapted to be energized from an electrical voltage source for producing an electromagnetic driving torque on said motor rotor and thereby said rotor member;

the distance along said spin axis between the longitudinal centers of said motor rotors being different than the distance along said spin axis between the longitudinal centers of said motor stators, whereby the electromagnetic fields active on said motor rotors when said motor stators are energized produce on said rotor member opposing longitudinal forces each tending to move said rotor member endwise in the direction of the corresponding motor rotor to longitudinally center the latter relative to its motor stator, and said stators may be selectively energized at the same or different voltage levels to impose on said rotor member a variable magnetic axial bias force tending to retain said rotor member in an axial position wherein said opposing longitudinal forces are balanced; and means for sensing the relative axial position of said rotor member relative to said barrel.

2. An electrical transducer according to claim 1, wherein:
the center distance between said motor stators is greater than the center distance between said motor rotors.

3. An electrical transducer according to claim 1, wherein:
said position sensing means comprises a magnet on said rotor member having north and south poles spaced circumferentially about said rotor member and a coil in said barrel about said magnet, whereby rotation of said magnet with said rotor member induces in said coil a voltage which is function of the relative axial position of said rotor member with respect to said barrel.

4. An electrical transducer according to claim 3, wherein:
each said motor means comprises a synchronous induction motor, whereby the voltages impressed on said motor stators may be varied to regulate said bias force without changing the rotary speed of said rotor member and said sensing coil voltage is a sole function of the relative axial position of said rotor member with respect to said barrel.

5. An electrical transducer comprising:
a barrel;
an elongate rotor member within said barrel having a central longitudinal spin axis;
bearing means supporting said rotor member in said barrel for rotation of said member on and endwise movement of said member along said spin axis;
electrical motor means for rotating said rotor member on said spin axis while permitting endwise movement of said member along said axis; and
means for sensing the relative axial position of said rotor member relative to said barrel, including a magnet on said rotor member having north and south poles spaced circumferentially about said member, and a coil in said barrel about said magnet in a manner such that the relative axial position of said magnet and coil changes in response to axial movement of said rotor member, whereby rotation of said magnet with said rotor member induces in said coil a voltage which is a function of the relative axial position of said rotor member with respect to said barrel.

6. An electrical transducer according to claim 5, wherein:
said motor means comprise synchronous induction motor means arranged to produce an electromagnetic axial bias force on said rotor member for urging said member axially to a given position relative to said barrel, whereby said motor means may be energized at various voltage levels to vary said axial bias force without altering the rotational speed of said rotor member and said sensing coil voltage is a sole function of the relative axial position of said rotor member with respect to said barrel.

7. An electrical transducer according to claim 5, wherein:
said magnet is conically tapered along said spin axis.

8. An electrical transducer comprising:
a pair of interfitting inner and outer sleeves which are relatively sized to define therebetween an annular hydrodynamic bearing gap;
motor means for rotating said inner sleeve at a speed sufficient to create within said gap a hydrodynamic bearing radially supporting said inner sleeve for rotation and axial movement relative to said outer sleeve;
said motor means including a magnetic motor rotor fixed within said inner sleeve and a motor stator coil about said outer sleeve in surrounding relation to said rotor and adapted to be energized from an electrical voltage source for producing an electromagnetic field which reacts with the magnetic field of said motor rotor to produce a driving torque on said rotor and thereby said inner sleeve; and
means for sensing the relative axial position of said inner sleeve with respect to said outer sleeve.

9. An electrical transducer according to claim 8, wherein:
said position sensing means comprises coacting sensing elements within said inner sleeve and about said outer sleeve.

10. An electrical transducer comprising:
a barrel containing a first sleeve;
a rotor member extending axially through said sleeve and including a second sleeve;
said barrel sleeve and said rotor sleeve being relatively sized to define therebetween an intervening annular hydrodynamic bearing gap;
motor means for driving said rotor member in rotation within said barrel sleeve at a speed sufficient to generate a hydrodynamic bearing within said bearing gap, said motor means comprising a pair of synchronous induction motors including motor rotors fixed within the ends of said rotor sleeve and motor stators surrounding the ends of said barrel sleeve and adapted to be energized from a DC voltage source to produce and electromagnetic driving torque on said rotor member for spinning the latter on its central axis;
the distance measured along said axis between the longitudinal centers of said motor rotors being less than the distance measured along said axis between the longitudinal centers of said motor stators and the overall length of said rotor member being less than the overall length of said barrel, whereby said stators may be selectively energized at the same of different voltage levels to selectively axially position said rotor member relative to said barrel and impose a variable axial restoring force on said rotor member; and
means for sensing the relative axial position of said rotor member with respect to said barrel including a magnet fixed within the center of said rotor sleeve and having north and south poled circumferentially spaced about said rotor member, and a coil about said barrel sleeve in surrounding relation to said magnet, whereby rotation of said magnet with said rotor member induces a voltage in said coil which is a function of the relative axial position of said rotor member relative to said barrel.